(12) United States Patent
Carrier et al.

(10) Patent No.: US 11,373,037 B2
(45) Date of Patent: Jun. 28, 2022

(54) INFERRING RELATION TYPES BETWEEN TEMPORAL ELEMENTS AND ENTITY ELEMENTS

(71) Applicant: International Business Machines Corporation, Armonk, NY (US)

(72) Inventors: Scott Carrier, Apex, NC (US); Brendan Bull, Durham, NC (US); Dwi Sianto Mansjur, Cary, NC (US); Paul Lewis Felt, Springville, UT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 303 days.

(21) Appl. No.: 16/589,622

(22) Filed: Oct. 1, 2019

(65) Prior Publication Data

US 2021/0097138 A1  Apr. 1, 2021

(51) Int. Cl.
*G06F 17/00* (2019.01)
*G06F 40/205* (2020.01)
*G06F 16/31* (2019.01)
*G06N 5/04* (2006.01)
*G06F 40/169* (2020.01)

(52) U.S. Cl.
CPC .......... *G06F 40/205* (2020.01); *G06F 16/322* (2019.01); *G06F 40/169* (2020.01); *G06N 5/04* (2013.01)

(58) Field of Classification Search
CPC .... G06F 40/205; G06F 16/322; G06F 40/169; G06F 40/284; G06F 16/951; G06F 40/211; G06N 5/04

USPC ............................................................ 704/9
See application file for complete search history.

(56) References Cited

U.S. PATENT DOCUMENTS

| 10,467,344 B1* | 11/2019 | Jade ........................ G06F 40/284 |
| 2012/0109637 A1* | 5/2012 | Merugu ................ G06F 40/284 |
| | | 704/9 |
| 2018/0025121 A1 | 1/2018 | Fei et al. |

(Continued)

OTHER PUBLICATIONS

Julien Tourille; "Extracting Clinical Event Timelines: Temporal Information Extraction and Coreference Resolution in Electronic Health Records"; Document and Text Processing. Hal archives-ouvertes; Université Paris-Saclay, 2018. English. NNT: 2018SACLS603. tel-0199722; Jan. 28, 2019; pp. 1-180.

(Continued)

*Primary Examiner* — Jason T Edwards
(74) *Attorney, Agent, or Firm* — Cantor Colburn LLP; Kelsey M. Skodje

(57) ABSTRACT

Examples described herein provide a computer-implemented method that includes receiving, by a processing device, the span of text, the span of text comprising a plurality of elements including at least an entity element and a temporal element. The method further includes organizing, by the processing device, the span of text as a natural language processing (NLP) parse tree. The method further includes traversing, by the processing device, the NLP parse tree by concatenating individual nodes of the span of text to generate the relation type between the entity element and the temporal element. The method further includes associating, by the processing device, the entity element, the relation type, and the temporal element together.

20 Claims, 6 Drawing Sheets

(56) References Cited

U.S. PATENT DOCUMENTS

2018/0089383 A1* 3/2018 Allen .................... G16H 50/20
2019/0066843 A1 2/2019 Carlson

OTHER PUBLICATIONS

Zengjian Liu, et al.; "Temporal indexing of medical entity in Chinese clinical notes" BMC Medical Informatics and Decision Making 2019, 19(Suppl 1):17; https://doi.org/10.1186/s12911-019-0735-x; The International Conference on ntelligent Biology and Medicine (ICIBM) 2018; Los Angeles, CA, USA. Jun. 10-12, 2018; 11 pages.

* cited by examiner

INFERRING RELATION TYPES BETWEEN TEMPORAL ELEMENTS AND ENTITY ELEMENTS

BACKGROUND

Embodiments of the present invention generally relate to natural language processing, and more specifically, to inferring relation types between temporal elements and entity elements.

Natural language processing (NLP) is a field of computer science, artificial intelligence, and linguistics concerned with the interactions between computers and human (natural) languages. As such, NLP is related to the area of human-computer interaction, and especially with regard to natural language understanding that enables computers to derive meaning from human or natural language input.

Many NLP systems make use of ontologies to assist in performing NLP tasks. An ontology is a representation of knowledge. A semantic ontology, in the case of NLP, is a representation of knowledge of the relationships between semantic concepts. Created by humans, usually by domain experts, ontologies are never a perfect representation of all available knowledge. They can, for example, include biases to a particular subarea of a given domain and may reflect the level of knowledge or attention to detail of the author. Ontologies are usually task inspired (i.e., they have some utility in terms of managing information or managing physical entities) and their design reflects the task for which their terminology is required. Generally speaking, the tasks hitherto targeted have not been focused on the needs of applications for cognitive computing or natural language processing and understanding.

Ontologies are often represented or modeled in hierarchical structures in which portions of knowledge are represented as nodes in a graph and relationships between these portions of knowledge are represented as edges between the nodes. Examples of structures, such as taxonomies and trees, are limited variations, but generally speaking, ontology structures are highly conducive to being represented as a graph.

Examples of such semantic ontologies include the Unified Medical Language System (UMLS) semantic network for the medical domain, RXNORM for the drug domain, Foundational Model of Anatomy (FMA) for the human anatomy domain, and the like. The UMLS data asset, for example, consists of a large lexicon (millions) of instance surface forms in conjunction with an ontology of concepts and inter-concept relationships in the medical domain.

SUMMARY

Embodiments of the present invention are directed to inferring a relation type between elements of a span of text.

A non-limiting example computer-implemented method includes receiving, by a processing device, the span of text, the span of text comprising a plurality of elements including at least an entity element and a temporal element. The method further includes organizing, by the processing device, the span of text as a natural language processing (NLP) parse tree. The method further includes traversing, by the processing device, the NLP parse tree by concatenating individual nodes of the span of text to generate the relation type between the entity element and the temporal element. The method further includes associating, by the processing device, the entity element, the relation type, and the temporal element together. Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
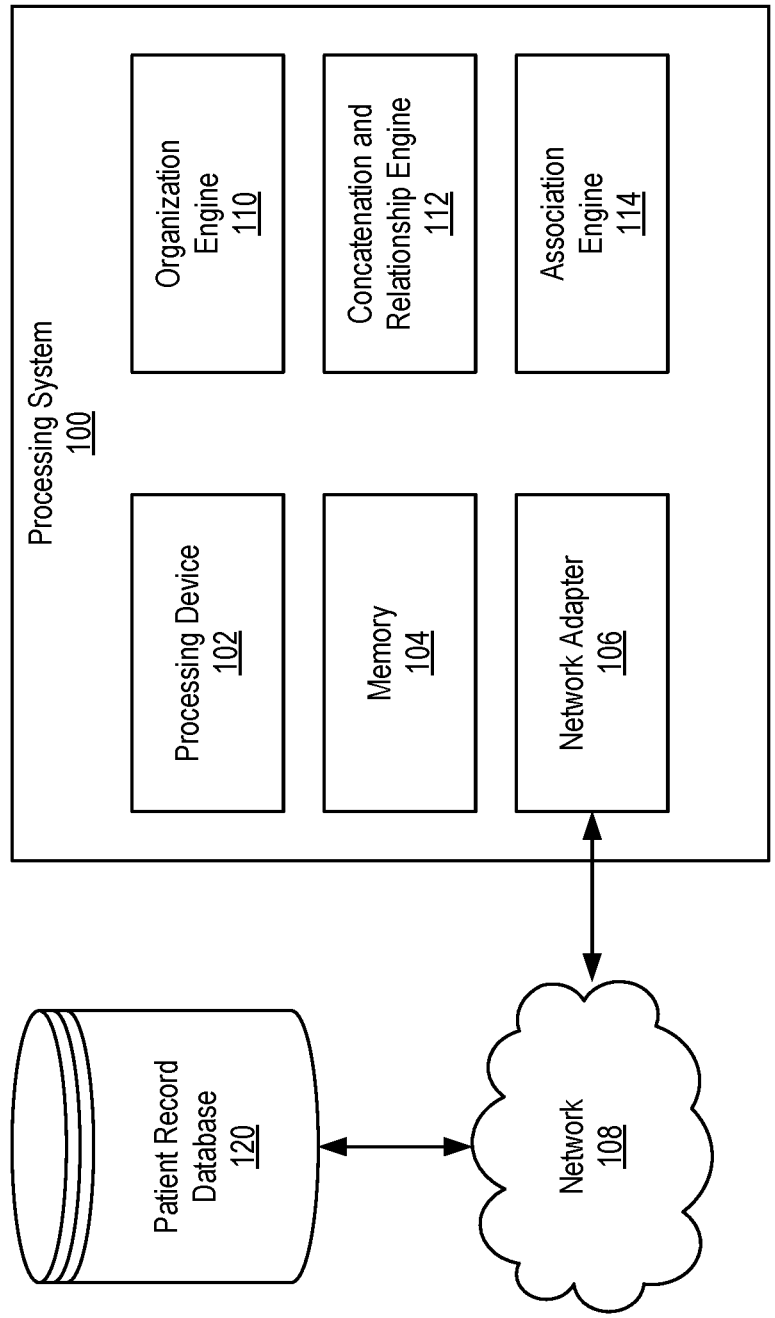
FIG. 1 depicts a block diagram of a processing system for inferring relation types between temporal elements and entity elements according to one or more embodiments described herein.

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for inferring relation types between temporal elements and entity elements. Annotators can detect temporal elements, such as a date, and associate the temporal elements with medical elements, such as a medication or procedure. As an example, it may be known that a date (i.e., temporal element) is associated with a medication (i.e., medical element). However, what the date represents is unknown. For example, a date associated with a procedure could be the procedure date but it could also be a consult date for a consult for the procedure. As another example, a date associated with a medication could be the start date, the end date, or another date associated with the medication, such as a date for a change of dosage. Absent some classification of the date association, there exists an ambiguity in the association.

One or more embodiments described herein address the shortcomings of the prior art by analyzing a semantic linkage in a natural language processing (NLP) parse tree of a span of text between entity elements (e.g., medical elements) and temporal elements and then generating a relation type using one or more associating terms in the span of text. The generated relation type uses language from the span of text to describe the association between the medical elements and the temporal elements.

An example embodiment for inferring relation types between temporal elements and entity elements includes receiving a span of text related to a patient. The span of text includes a plurality of elements, including at least a medical element and a temporal element. The example embodiment further includes organizing the span of text as an NLP parse tree. The example embodiment then includes traversing the NLP parse tree by concatenating individual nodes of the span of text to generate the relation type between the medical element and the temporal element. The medical element, the relation type, and the temporal element can then been associated together, and an electronic patient file associated with the patient can be annotated with the associated medical element, the relation type, and the temporal element. It should be appreciated that embodiments described herein apply labels to what are otherwise general temporal elements associated with entities where no labels exist. This can be done in both medical and non-medical environments.

One or more embodiments of the present invention provide technological improvements over current methods of natural language processing. Disadvantages of contemporary approaches may include introducing ambiguities in associations between medical elements and temporal elements. One or more embodiments of the present invention provide technical solutions to one or more of these disadvantages of existing solutions by generating relation types to describe the associations between the medical elements and temporal elements. Accordingly, the associations among the medical elements, relation types, and temporal elements that are generated by the embodiments described herein represent an improvement to existing natural language processing techniques because the presently disclosed associations resolve ambiguities existing in conventional natural language processing approaches. As a result of these technical features and technical effects, a natural language processing system in accordance with example embodiments of the disclosure represents an improvement to conventional natural language processing techniques. It should be appreciated that the above examples of technical features, technical effects, and improvements to technology of example embodiments of the disclosure are merely illustrative and not exhaustive.

FIG. 1 depicts a block diagram of a processing system 100 for inferring relation types between temporal elements and entity elements according to one or more embodiments described herein according to aspects of the present disclosure. The processing system 100 includes a processing device 102, a memory 104, an organization engine 110, a concatenation and relationship engine 112, and an association engine 114 configured and arranged as shown.

The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 102 for executing those instructions. Thus a system memory (e.g., memory 104) can store program instructions that when executed by the processing device 102 implement the engines described herein. Other engines can also be utilized to include other features and functionality described in other examples herein.

Figure 6:
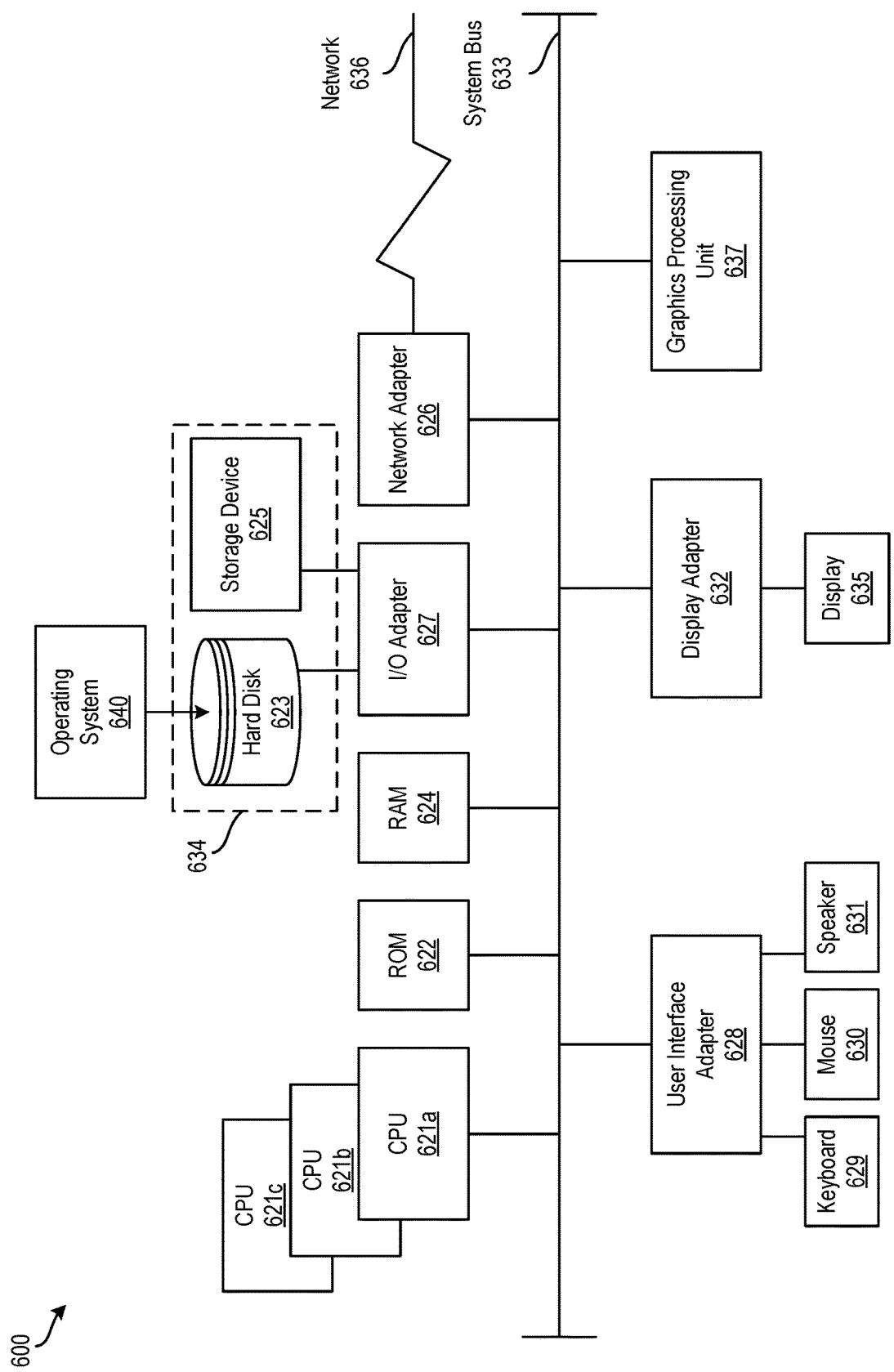
FIG. 6 depicts a block diagram of a processing system for implementing the presently described techniques according to one or more embodiments described herein.

The processing system 100 can further include a network adapter 106 (e.g., the network adapter 626 of FIG. 6). The network adapter 106 enables the processing system 100 to transmit data to and/or receive data from other sources, such as other processing systems, data repositories, and the like. As an example, the processing system 100 can transmit data to and/or receive data from a patient record database 120 directly and/or via a network 108.

The network 108 represents any one or a combination of different types of suitable communications networks such as, for example, cable networks, public networks (e.g., the Internet), private networks, wireless networks, cellular networks, or any other suitable private and/or public networks. Further, the network 108 can have any suitable communication range associated therewith and may include, for example, global networks (e.g., the Internet), metropolitan area networks (MANs), wide area networks (WANs), local area networks (LANs), or personal area networks (PANs). In addition, the network 108 can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Figure 2:
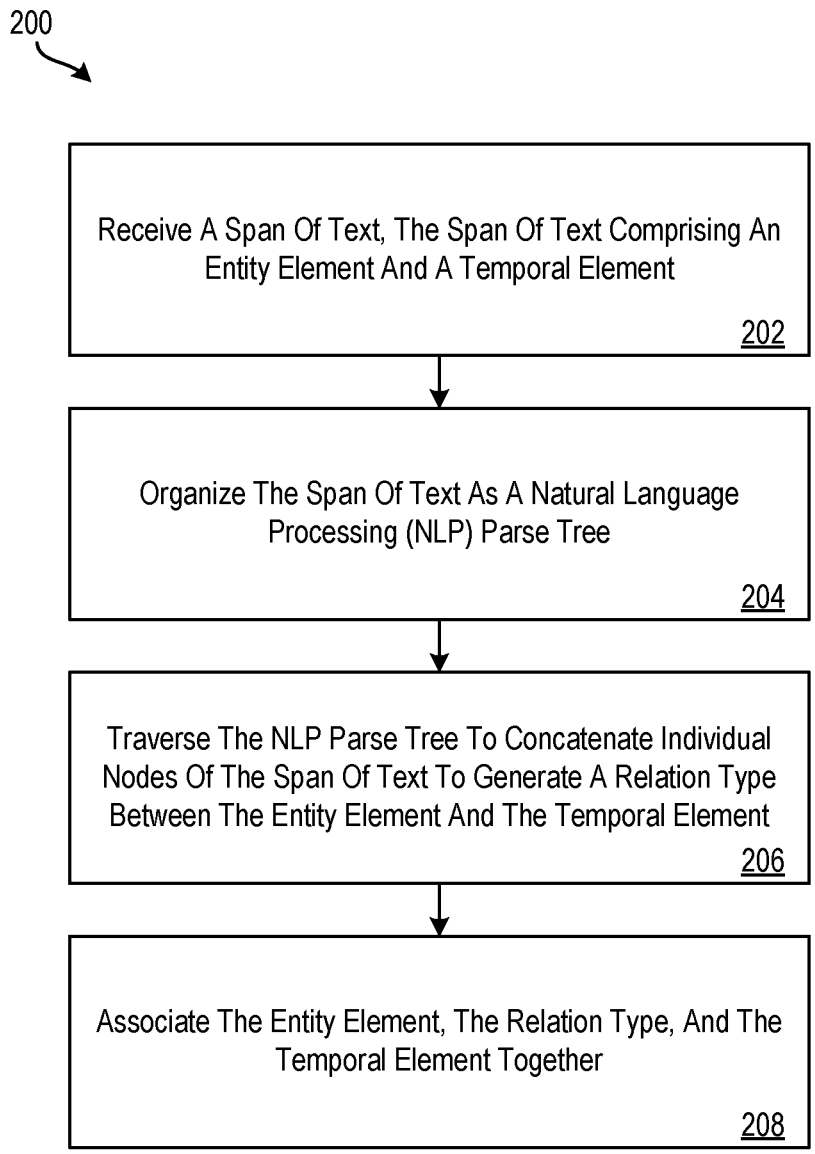
FIG. 2 depicts a flow diagram of a method for inferring relation types between temporal elements and entity elements according to one or more embodiments described herein.

The features and functionality of the processing system 100 are now described with reference to FIG. 2 but are not so limited. In particular, FIG. 2 depicts a flow diagram of a method 200 for inferring relation types between temporal elements and entity elements according to one or more embodiments described herein. The method 200 can be implemented on any suitable processing system (e.g., the processing system 100 of FIG. 1, the cloud computing node 10 of FIG. 4, the processing system 600 of FIG. 6, etc.), any suitable processing device (e.g., the processing device 102 of FIG. 1, the processors 621 of FIG. 6, etc.), and/or combinations thereof.

At block 202, the organization engine 110 receives a span of text related to a patient. The span of text includes a plurality of elements, including at least a medical element and a temporal element. The span of text can also include other, non-medical, non-temporal elements. A span of text (i.e., a document or query) can be passed through a processing pipeline. An example span of text is as follows: "Patient is scheduled to have a splenectomy consult on 06.01.2019." In this example, the medical element is "splenectomy" (i.e., a medical procedure) and the temporal element is "06.01.2019" (i.e., a date). The other elements of the span of text are non-medical, non-temporal elements.

Figure 3:
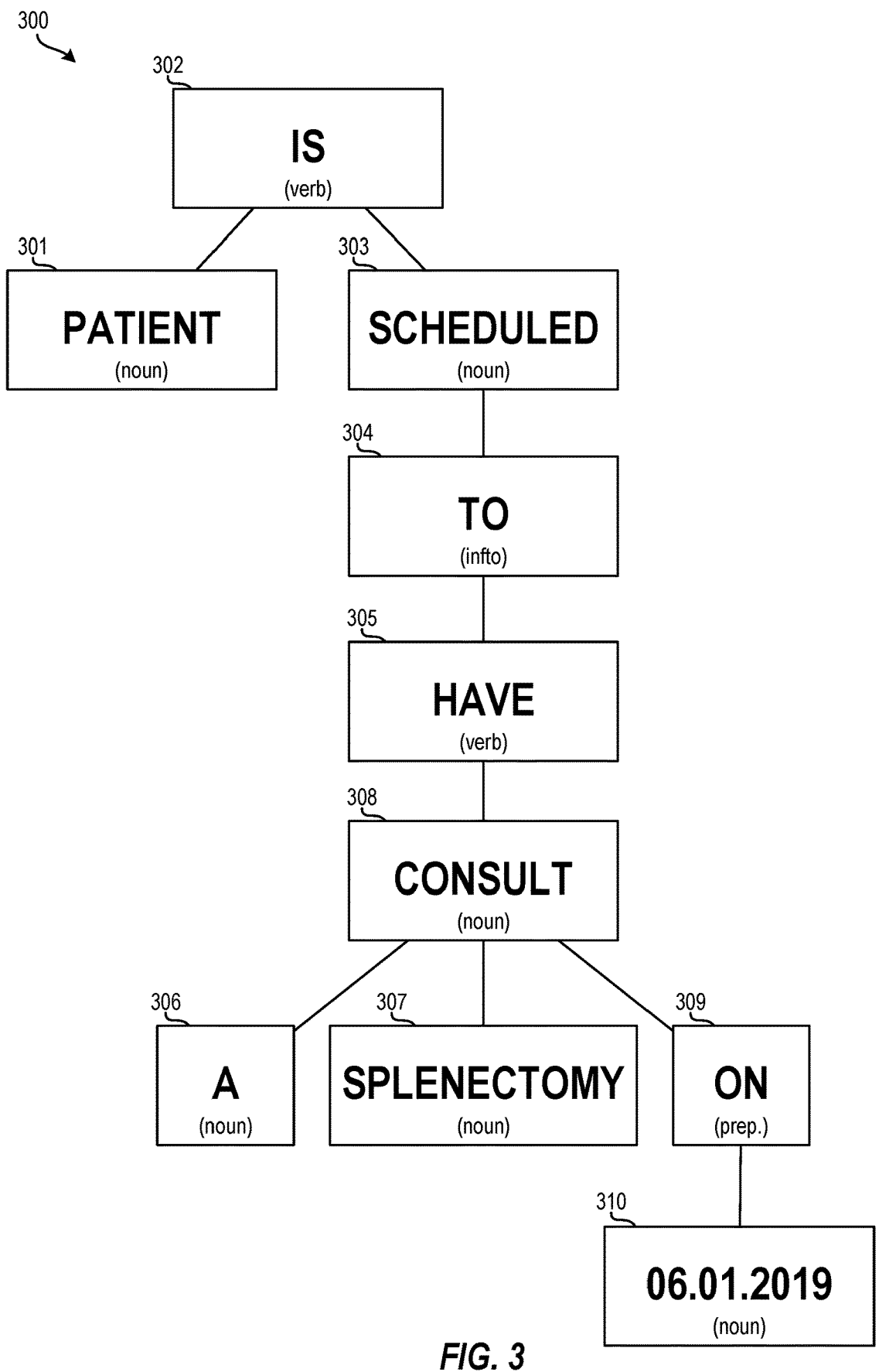
FIG. 3 depicts a natural language processing parse tree according to one or more embodiments described herein.

At block 204, the organization engine 110 organizes the span of text as a tree-based data structure (also referred to as a "natural language processing (NLP) parse tree"). To extrapolate the medical context of temporal information (i.e., a date), the span of text can be organized into individual sentences in the form of NLP parse trees. Using the example span of text described herein (i.e., "Patient is scheduled to have a splenectomy consult on 06.01.2019."), FIG. 3 depicts an NLP parse tree 300 according to one or more embodiments described herein. The NLP parse tree 300 breaks down the span of text into its individual elements, including: element 301 ("PATIENT"), element 302 ("IS"), element 303 ("SCHEDULED"), element 304 ("TO"), element 305 ("HAVE"), element 306 ("A"), element 307 ("SPLENECTOMY"), element 308 ("CONSULT"), element 309 ("ON"), and element 310 ("06.01.2019"). Each of the elements 301-310 has associated therewith a part of speech (POS), which is determined using natural language processing techniques. In the example of FIG. 3, the elements 301, 303, 306-308, 310 have a POS of "noun;" the elements 302, 305 have a POS of "verb;" the element 304 has a POS of "infto;" and the element 309 has a POS of "preposition"). The POS "infto" is a slot name defined as "the preinfinitive sense of 'to' or analogs in other languages." In other words, it is a slot for any preposition that fills the roll that "to" typically plays in English. In examples, slot names are given to words that rules are built around to understand the words that inform the type of temporal relationship that exists.

With continued reference to FIG. 2, at block 206, the concatenation and relationship engine 112 traverses the NLP parse tree by concatenating individual nodes of the span of text to generate the relation type between the medical element and the temporal element. Returning to the example of FIG. 3, the concatenation and relationship engine 112 identifies associated elements (e.g., the elements 307 and 310) and traverses the NLP parse tree (e.g., the NLP parse tree 300 of FIG. 3) from one associated element to another and concatenates intervening nodes (e.g., the elements 308 and 309) to generate a relation type between the two elements (i.e., the medical and temporal elements) that describes their association. For example: [splenectomy]-[consult]-[on]-[06.01.2019] (i.e., [ELEMENT 307]-[ELEMENT 308]-[ELEMENT 309]-[ELEMENT 310]). In this example, the generated relation type between the medical and temporal elements (i.e., "splenectomy" and "06.01.2019") is as follows: [consult]-[on] becomes "consultOn" relation.

With continued reference to FIG. 2, at block 208, the association engine 114 associates the medical element, the relation type, and the temporal element together. Continuing with the example of FIG. 3, the association of the relation type "consultOn" is as follows: [splenectomy]-[consultOn]-[06.01.2019]. Accordingly, the relation type creates an association between the medical element and temporal element, thereby reducing/eliminating ambiguities that may exist with respect to the medical element and the temporal element.

Additional processes also may be included. For example, the method 200 can include annotating an electronic patient file associated with the patient with the associated medical element, the relation type, and the temporal element. The electronic patient file can be stored, for example, in the patient record database 120 or in another suitable database or data repository. It should be understood that the process depicted in FIG. 2 represents an illustration, and that other processes may be added or existing processes may be removed, modified, or rearranged without departing from the scope of the present disclosure.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
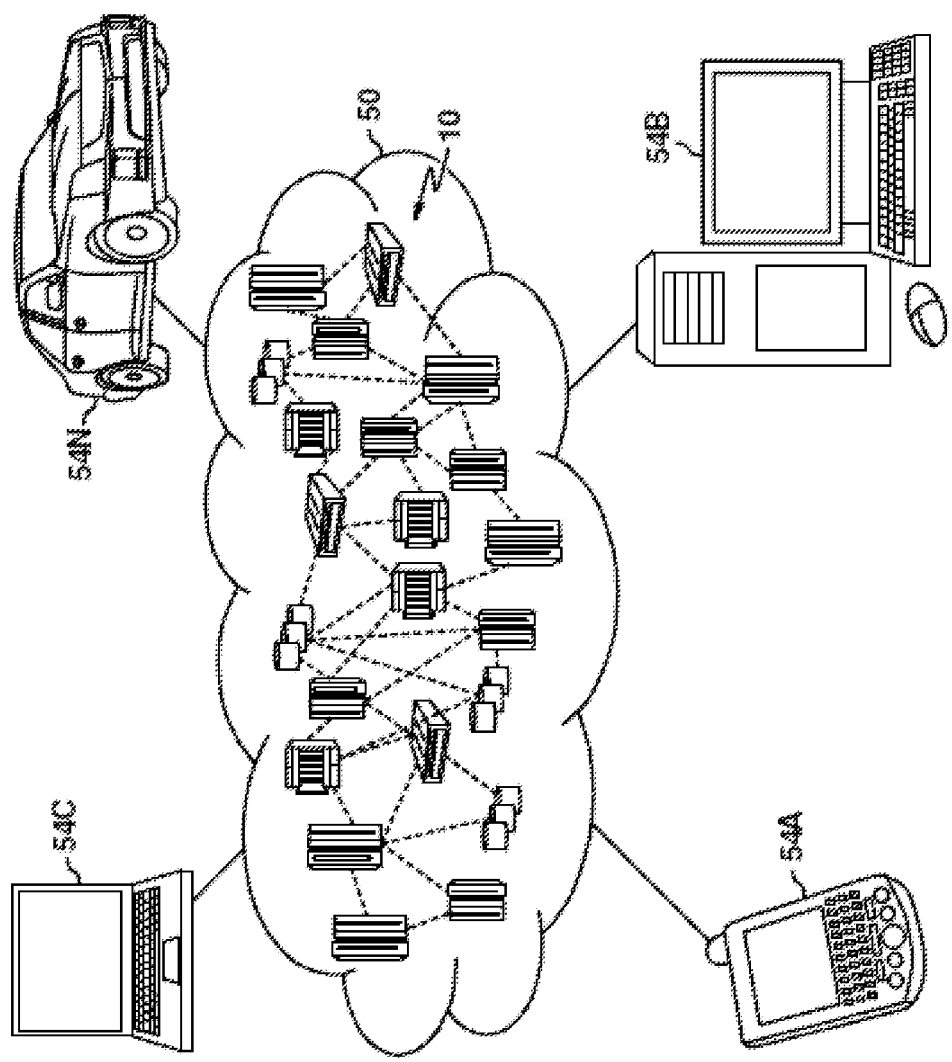
FIG. 4 depicts a cloud computing environment according to one or more embodiments described herein.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
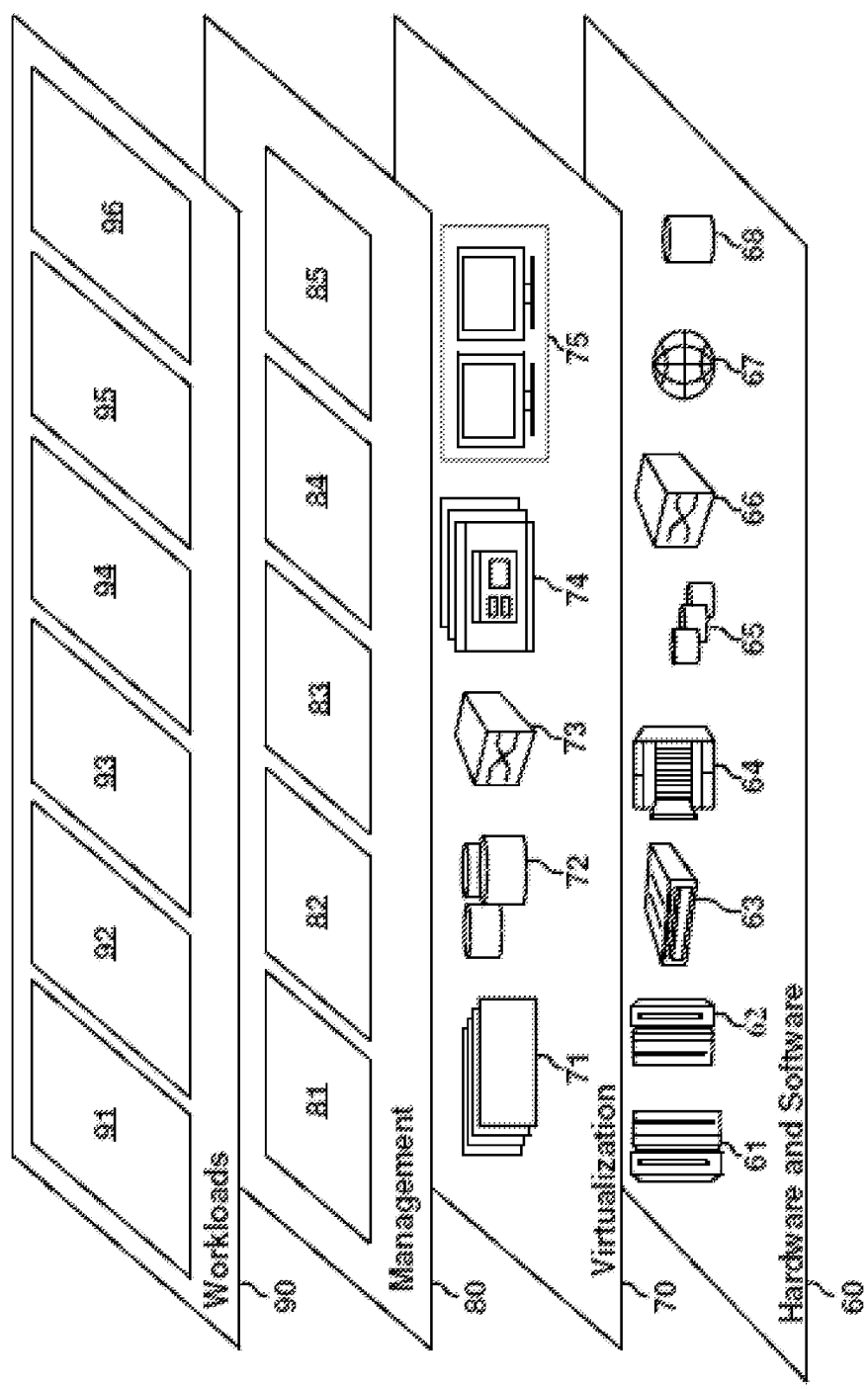
FIG. 5 depicts abstraction model layers according to one or more embodiments described herein.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and inferring relation types between temporal elements and entity elements 96.

It is understood that one or more embodiments described herein is capable of being implemented in conjunction with any other type of computing environment now known or later developed. For example, FIG. 6 depicts a block diagram of a processing system 600 for implementing the techniques described herein. In accordance with one or more embodiments of the present invention, the processing system 600 is an example of a cloud computing node 10 of FIG. 4. In examples, processing system 600 has one or more central processing units ("processors" or "processing resources") 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to system memory (e.g., random access memory (RAM) 624) and various other components via a system bus 633. Read only memory (ROM) 622 is coupled to system bus 633 and may include a basic input/output system (BIOS), which controls certain basic functions of processing system 600.

Further depicted are an input/output (I/O) adapter 627 and a network adapter 626 coupled to system bus 633. I/O adapter 627 may be a small computer system interface (SCSI) adapter that communicates with a hard disk 623 and/or a storage device 625 or any other similar component. I/O adapter 627, hard disk 623, and storage device 625 are collectively referred to herein as mass storage 634. Operating system 640 for execution on processing system 600 may be stored in mass storage 634. The network adapter 626 interconnects system bus 633 with an outside network 636 enabling processing system 600 to communicate with other such systems.

A display (e.g., a display monitor) 635 is connected to system bus 633 by display adapter 632, which may include a graphics adapter to improve the performance of graphics intensive applications and a video controller. In one aspect of the present disclosure, adapters 626, 627, and/or 632 may be connected to one or more I/O busses that are connected to system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. A keyboard 629, mouse 630, and speaker 631 may be interconnected to system bus 633 via user interface adapter 628, which may include, for example, a Super I/O chip integrating multiple device adapters into a single integrated circuit.

In some aspects of the present disclosure, processing system 600 includes a graphics processing unit 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing, and has a highly parallel structure that makes it more effective than general-purpose CPUs for algorithms where processing of large blocks of data is done in parallel.

Thus, as configured herein, processing system 600 includes processing capability in the form of processors 621, storage capability including system memory (e.g., RAM 624), and mass storage 634, input means such as keyboard 629 and mouse 630, and output capability including speaker 631 and display 635. In some aspects of the present disclosure, a portion of system memory (e.g., RAM 624) and mass storage 634 collectively store the operating system 640 such as the AIX® operating system from IBM Corporation to coordinate the functions of the various components shown in processing system 600.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for inferring a relation type between elements of a span of text, the method comprising:
    receiving, by a processing device, the span of text, the span of text comprising a plurality of elements including at least an entity element and a temporal element;
    organizing, by the processing device, the span of text as a natural language processing (NLP) parse tree;
    traversing, by the processing device, the NLP parse tree, wherein the traversing comprises:
        identifying the entity element and the temporal element,
        identifying individual nodes of the span of text between the entity element and the temporal element, and
        concatenating the individual nodes of the span of text between the entity element and the temporal element to generate the relation type between the entity element and the temporal element, wherein the relation type is based on the individual nodes of the span of text between the entity element and the temporal element; and
    associating, by the processing device, the entity element, the relation type, and the temporal element together.

2. The computer-implemented method of claim 1, further comprising:
    annotating an electronic file with the associated entity element, the relation type, and the temporal element.

3. The computer-implemented method of claim 1, organizing the span of text further comprises identifying a part of speech associated with each of the plurality elements of the span of text.

4. The computer-implemented method of claim 3, wherein the part of speech is selected from a group consisting of a verb, a noun, and a preposition.

5. The computer-implemented method of claim 1, wherein the temporal element is a date.

6. The computer-implemented method of claim 1, wherein the temporal element is a date and a time.

7. The computer-implemented method of claim 1, wherein the entity element is a medical element.

8. The computer-implemented method of claim 7, wherein the medical element is a medical procedure.

9. The computer-implemented method of claim 7, wherein the medical element is a medication.

10. A system comprising:
a memory comprising computer readable instructions; and
a processing device for executing the computer readable instructions, the computer readable instructions controlling the processing device to perform operations for inferring a relation type between elements of a span of text, the operations comprising:
receiving, by the processing device, the span of text, the span of text comprising a plurality of elements including at least an entity element and a temporal element;
organizing, by the processing device, the span of text as a natural language processing (NLP) parse tree;
traversing, by the processing device, the NLP parse tree, wherein the traversing comprises:
identifying the entity element and the temporal element,
identifying individual nodes of the span of text between the entity element and the temporal element, and
concatenating the individual nodes of the span of text between the entity element and the temporal element to generate the relation type between the entity element and the temporal element, wherein the relation type is based on the individual nodes of the span of text between the entity element and the temporal element; and
associating, by the processing device, the entity element, the relation type, and the temporal element together.

11. The system of claim 10, wherein the operations further comprise:
annotating an electronic file with the associated entity element, the relation type, and the temporal element.

12. The system of claim 10, wherein organizing the span of text further comprises identifying a part of speech associated with each of the plurality elements of the span of text.

13. The system of claim 12, wherein the part of speech is selected from a group consisting of a verb, a noun, and a preposition.

14. The system of claim 10, wherein the temporal element is a date.

15. The system of claim 10, wherein the temporal element is a date and a time.

16. The system of claim 10, wherein the entity element is a medical element.

17. The system of claim 16, wherein the medical element is a medical procedure.

18. The system of claim 16, wherein the medical element is a medication.

19. A computer program product comprising a computer readable storage medium having program instructions embodied therewith, the program instructions executable by a processor to cause the processor to perform operations for inferring a relation type between elements of a span of text, the operations comprising:
receiving, by the processing device, the span of text, the span of text comprising a plurality of elements including at least an entity element and a temporal element;
organizing, by the processing device, the span of text as a natural language processing (NLP) parse tree;
traversing, by the processing device, the NLP parse tree, wherein the traversing comprises:
identifying the entity element and the temporal element,
identifying individual nodes of the span of text between the entity element and the temporal element, and
concatenating the individual nodes of the span of text between the entity element and the temporal element to generate the relation type between the entity element and the temporal element, wherein the relation type is based on the individual nodes of the span of text between the entity element and the temporal element; and
associating, by the processing device, the entity element, the relation type, and the temporal element together.

20. The computer program product of claim 19, wherein the operations further comprise:
annotating an electronic file with the associated entity element, the relation type, and the temporal element.

* * * * *